United States Patent
Folco et al.

(10) Patent No.: US 9,917,811 B2
(45) Date of Patent: Mar. 13, 2018

(54) SECURITY THREAT IDENTIFICATION, ISOLATION, AND REPAIRING IN A NETWORK

(71) Applicant: International Business Machines Corporation, Armonk, NY (US)

(72) Inventors: Rafael C. S. Folco, Santa Bárbara d'Oeste (BR); Plinio A. S. Freire, Campinas (BR); Breno H. Leitao, Campinas (BR); Tiago N. d. Santos, Araraquara (BR)

(73) Assignee: International Business Machines Corporation, Armonk, NY (US)

( * ) Notice: Subject to any disclaimer, the term of this patent is extended or adjusted under 35 U.S.C. 154(b) by 26 days.

(21) Appl. No.: 14/879,549

(22) Filed: Oct. 9, 2015

(65) Prior Publication Data
US 2017/0104718 A1 Apr. 13, 2017

(51) Int. Cl.
*H04L 29/06* (2006.01)
*H04L 12/24* (2006.01)

(52) U.S. Cl.
CPC .......... *H04L 63/02* (2013.01); *H04L 41/0846* (2013.01); *H04L 63/0209* (2013.01); *H04L 63/1416* (2013.01); *H04L 63/1433* (2013.01); *H04L 63/1441* (2013.01); *H04L 63/20* (2013.01)

(58) Field of Classification Search
CPC ..... H04L 63/02; H04L 63/1433; G06F 21/55; G06F 21/552; G06F 21/577
See application file for complete search history.

(56) References Cited

U.S. PATENT DOCUMENTS

| 7,213,065 | B2 | 5/2007 | Watt | |
|---|---|---|---|---|
| 8,607,252 | B2 | 12/2013 | Bernardes et al. | |
| 8,661,547 | B1 | 2/2014 | Kononov et al. | |
| 8,677,493 | B2 | 3/2014 | Singh et al. | |
| 8,739,283 | B1 | 5/2014 | Zhang et al. | |
| 8,893,274 | B2 | 11/2014 | Zhu et al. | |
| 2010/0017512 | A1* | 1/2010 | Ciano | G06F 9/455 709/225 |
| 2010/0199351 | A1* | 8/2010 | Protas | G06F 21/577 726/25 |
| 2011/0078797 | A1* | 3/2011 | Beachem | G06F 21/53 726/25 |

(Continued)

FOREIGN PATENT DOCUMENTS

| WO | 03021402 A2 | 3/2003 |
|---|---|---|
| WO | 2014079009 A1 | 5/2014 |

OTHER PUBLICATIONS

Folco et al., "Security Threat Identification, Isolation, and Repairing in a Network", U.S. Appl. No. 14/919,850, filed Oct. 22, 2015.

(Continued)

*Primary Examiner* — David Pearson
(74) *Attorney, Agent, or Firm* — Joseph W. Cruz

(57) ABSTRACT

A first computing system may identify a security threat located at least at a first virtual server. The first virtual server may be within a second computing system. The first computing system may provision, in response to the identifying, a first firewall associated with the first virtual server. The first firewall may include a rule to deny all communication transmitted from the first virtual server. The first computing system may execute, in response to the provisioning, a first repair operation to repair the first virtual server.

8 Claims, 8 Drawing Sheets

(56) References Cited

U.S. PATENT DOCUMENTS

| | | |
|---|---|---|
| 2011/0185423 A1 | 7/2011 | Sallam |
| 2011/0258701 A1* | 10/2011 | Cruz .................... G06F 21/554 726/23 |
| 2013/0055398 A1 | 2/2013 | Li et al. |
| 2013/0160126 A1 | 6/2013 | Kapoor et al. |
| 2013/0174257 A1 | 7/2013 | Zhou et al. |
| 2014/0130161 A1 | 5/2014 | Golovanov |
| 2014/0351934 A1 | 11/2014 | Mitra |
| 2015/0237066 A1* | 8/2015 | Ponsford ............ H04L 63/1441 726/22 |
| 2015/0381651 A1 | 12/2015 | Lietz et al. |
| 2016/0381058 A1 | 12/2016 | Antony |

OTHER PUBLICATIONS

List of IBM Patents or Patent Applications Treated as Related, dated Oct. 21, 2015, pp. 1-2.

Cowan, J., "Heart Bleed Bug Still an Issue for Some Cloud Services", SiteProNews, Breaking News Cloud Technology, Apr. 10, 2014, pp. 1-2. Copyright Jayde Online, Inc. 2015. http://www.sitepronews.com/2014/04/10/heart-bleed-bug-still-issue-cloud-services/.

Hsu et al., "Divergence Detector: A Fine-grained Approach to Detecting VM-Awareness Malware", 7th International Conference on Software Security and Reliability, 2013 IEEE. © 2013 IEEE, pp. 80-89. DOI 10.1109/SERE.2013.23.

Mell et al., "The NIST Definition of Cloud Computing: Recommendations of the National Institute of Standards and Technology", U.S. Department of Commerce, Special Publication 800-145, Sep. 2011, 7 pages.

Wei et al., "Managing Security of Virtual Machine Images in a Cloud Environment", CCSW'09, Nov. 13, 2009, Chicago, Illinois, USA, pp. 91-96. Copyright 2009 ACM. DOI: 10.1145/1655008.1655021.

* cited by examiner

SECURITY THREAT IDENTIFICATION, ISOLATION, AND REPAIRING IN A NETWORK

BACKGROUND

This disclosure relates generally to managing server-side security, and more specifically, to identifying a security threat on a server computing system, isolating the server computing system instance that contains the security threat, and cleaning such server computing system instance.

Server computing systems may contain various security vulnerabilities. Security vulnerabilities are weaknesses or flaws in program design, hardware design, implementation, operation, and/or internal control, which may be exploited to violate a system's security policy. If server computing systems contain security vulnerabilities, an unauthorized user may inject malicious code (e.g., viruses, trojan horses, etc.) into the server computing system.

For particular server computing system network environments, once malicious code is injected on one instance (e.g., a virtual machine), the malicious code may spread to other instances of the server computing systems. For example, if a server computing system includes multiple virtual machines, and a first virtual machine was infected with a virus, the virus may spread to a second virtual machine. Malicious code may have many undesirable effects, such as causing system crash, slowing processing speed, distribution of undesired pop-up ads, logging of key strokes for unauthorized access to passwords, etc.

SUMMARY

One or more embodiments are directed to a computer-implemented method, a system, and a computer program product for repairing a computing system in a network that is associated with a security threat. A first computing system may identify a security threat located at least at a first virtual server. The first virtual server may be within a second computing system. The first computing system may provision, in response to the identifying, a first firewall associated with the first virtual server. The first firewall may include a rule to deny communication transmitted from the first virtual server. The first computing system may execute, in response to the provisioning, a first repair operation to repair the first virtual server.

Figure 1:
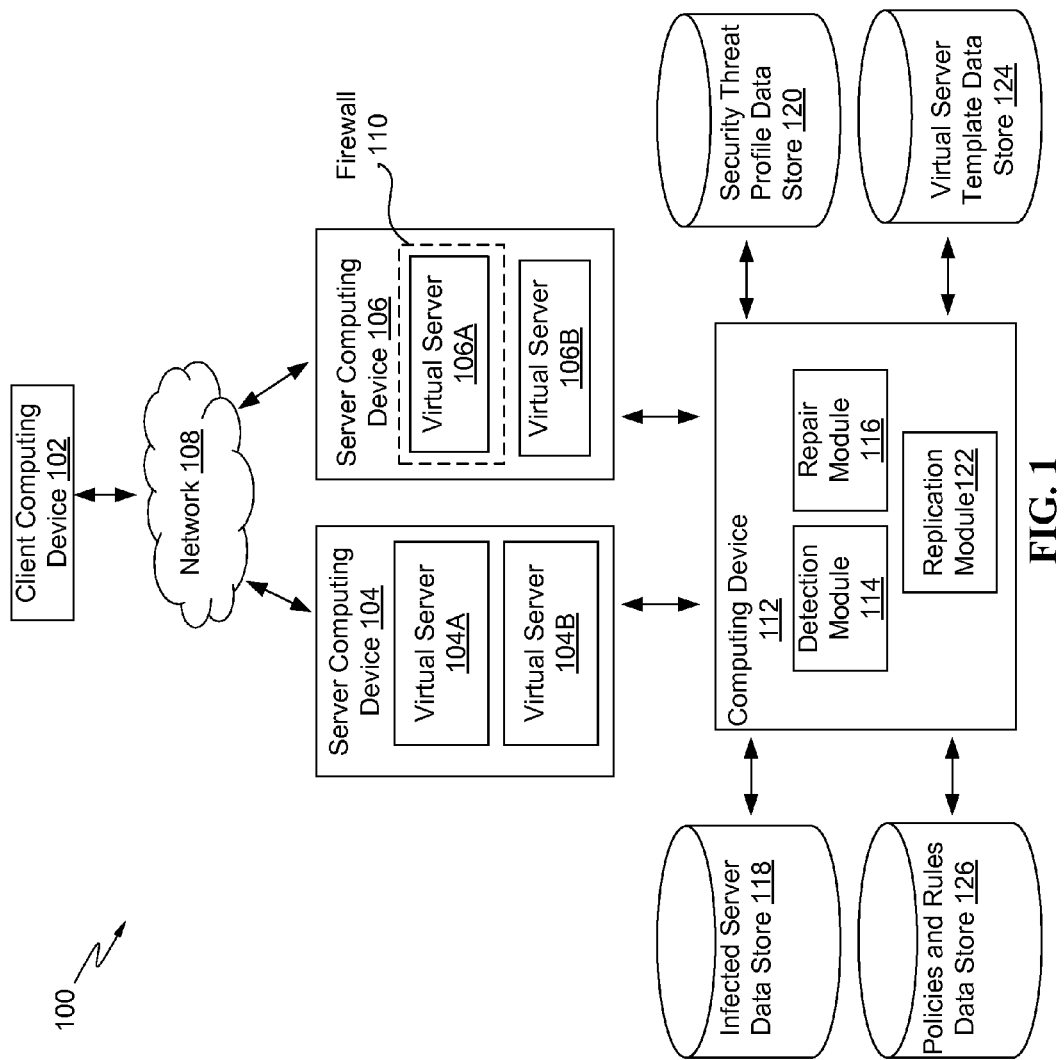
FIG. 1 is a block diagram of a computing environment 100, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to identifying a security threat on a server computing system, isolating the server computing system instance that contains the security threat, and cleaning such server computing system instance. While the present disclosure is not necessarily limited to such applications, various aspects of the disclosure may be appreciated through a discussion of various examples using this context.

Cloud-based technology has become a practical industry standard in the last few years. Consequently, a new set of information technology challenges may require efficient solutions, such as cloud security. One of the main concerns is the danger related to security vulnerabilities (e.g., program bugs, program defects, program holes, errors, etc.) and the potential for malicious code to be injected into a cloud networking environment such that there is a mass infection of servers. The mass infection of servers may affect an entire cloud or other networking environment and the potential compromise of private or public data stored to the servers. "Malicious code," as described herein may refer to code in any part of a software system or script that causes an unauthorized alteration of a program that leads to undesirable effects from a user standpoint (e.g., unwanted ads), security breaches, and/or damage to a computing system. Examples of malicious code is malware such as viruses, rootkits, spyware, adware, etc.

The security vulnerability management and malware infection management on the cloud is still a problem for information technology professionals. For example, even if security threats are detected, cleaning of the environment may take extensive administrator or manual user efforts, which may waste time. Accordingly, embodiments of the present disclosure are directed to automated processes of identifying a security threat on a server computing system, isolating the server computing system virtual server that contains the security threat, and repairing such server computing system virtual server. As disclosed herein, the term "security threat" may be any known security vulnerability and/or malicious code (e.g., malware).

FIG. 1 is a block diagram of a computing environment 100, according to embodiments. The computing environment 100 may include a client computing device 102, one or more server computing devices (e.g., 104 and 106), a computing device 112 (e.g., computing system), and a network 108. In some embodiments, the computing device 112 may have access to a security threat profile data store 120, an infected server data store 118, a virtual server template data store 124, and a policies and rules data store 126, as described in more detail below. In some embodiments, the computing environment 100 may be the cloud computing environment 50 of FIG. 7 or cloud computing environment 320 of FIG. 3 (or included in the cloud computing environment 50 and/or 320). Consistent with some embodiments, the client computing device 102, the server computing devices 104, 106, and/or the computing device 112 may be configured the same or analogous to the computer system/server 12, as specified in FIG. 6.

In some computing environments 100, more or fewer computing devices may be present than illustrated in FIG. 1 to perform various embodiments. For example, the computing environment 100 may not necessarily include the server computing device 106. In some embodiments, each of the data stores (i.e., infected server data store 118, policies and rules data store 126, security threat profile data store 120, and the virtual server template data store 124) may be individual servers (e.g., database servers). Further, in some embodiments, each of the data stores may be databases that include structured data.

The client computing device 102 and/or the server computing devices 104, 106, and 112 may communicate with each other via any suitable network 108. For example, the network 108 may be a local area network (LAN), a general wide area network (WAN), and/or a public network (e.g., the Internet).

The server computing devices 104 and/or 106 may be any suitable computing devices or servers consistent with embodiments of the present disclosure. For example, the server computing devices 104 and 106 may be physically configured as a blade server, rack server, a cloud server, etc. Types of server hosting may include shared, virtual, clustered (e.g., Network Attached Clustered Storage Systems), and cloud systems or any other server hosting. Server application types may include web servers (e.g., Apache web servers), application servers, specialized servers such as file, printer and database servers (e.g., MySQL servers), media and mail servers, etc. In some embodiments, the computing device 112 is a server computing system and may include its own virtual servers.

In some embodiments, the server computing devices 104 and/or 106 may include a Guest Virtual Machine (VM) Agent software module that establishes a connection with the computing device 112 in order to perform various functions. For example, the Guest VM Agent may provide VM security information to the computing system 112 (e.g., Secure Sockets Layer (SSL) encryption information). The Guest VM Agent may also communicate with the firewall 110 in order to apply rules provided by the computing device 112, as discussed in more detail below. The program modules within the computing device 112 (e.g., the Central Security Agent) may manage a VM by taking advantage of direct contact with the VMs, such as utilizing VMWare Workstation. "VMWare Workstation" is a hypervisor that enables users to set up one or more VMs on a particular physical host, and use them along with the physical host. In some embodiments, the program modules may manage a VM by taking advantage of console connections. A user can connect to a VM using the VMs "console," which is the remote control system of a VM and enables the user to work and interact with a particular VM. In some embodiments, the program modules of computing device 112 may manage a VM is by indirect access from a non-hypervisor method, such as software that allows remote commands (e.g., SSH, with syntax like: ssh-OPTIONS-p SSH_PORT user@remote_server "remote_command1; remote_command2; remote_script.sh").

As illustrated in FIG. 1, the server computing device 104 and 106 may include various virtual servers. For example, server computing device 104 may include virtual servers 104A and 104B, and server computing device 106 may include virtual servers 106A and 106B. A virtual server (e.g., a virtual machine (VM)), is a virtual instance that may include its own configuration files (e.g., to configure setting such as applications, server processes, and operating system settings, etc.), operating system, kernel, applications, and/or virtual disks, and furthermore may also share hardware resources with other virtual servers. In some embodiments a virtual server is a VM. A VM may be a full copy or image of an operating system and all of the hardware that the operating system needs to run (i.e., a system image). Each VM within a host may include the same or unique operating systems. In some embodiments, a virtual server may be a container, as opposed to a VM. A "container," in some embodiments, is a virtual instance that may run only a portion of an operating system (e.g., at least a kernel), other applications, libraries, and/or system resources to run a particular program. Accordingly, a container may not be a "full" copy of an operating system and entire system image like a VM, but is a lighter virtual instance than a VM. A container may also run the same kernel as other virtual instances for a particular host but may optionally run a different distribution (e.g., other program applications).

In some embodiments, all of the modules within the computing device 112 (e.g., detection module 114, repair module 116, and replication module 122) may be part of a cloud hypervisor. In some embodiments, the computing device 112 may be an external centralized system. An "external centralized system" may be part of a different computing environment than the computing environment 100 and therefore be associated with a different network such that the computing device 112 may not become infected with the same malicious code that is infecting server computing devices 104 and/or 106.

In some embodiments, the computing device 112 may be the entity that identifies, isolates, and cleans a security threat found on the server computing devices 104 and/or 106. For example, the computing device 112 may include a detection module 114 to detect whether there are any security threats within the server computing devices 104 or 106. In some embodiments, the detection module 114 may be configured to poll each of the server computing devices 104 or 106 for security threats, as described in more detail below.

In some embodiments, the detection module 114 may determine whether there are any security threats by comparing various hashes, and/or coding algorithms as found on the server computing devices 104 or 106 with historical security threat profiles or signatures, as found in the security threat profile data store 120. For example, the security threat profile data store 120 may include profiles of known software vulnerabilities (e.g., known vulnerabilities for establishing older versions of a Secure Sockets Layer (SSL) connection). Therefore, the detection module 114 may scan each of the server computing devices 104 and 106 to determine whether there are any known vulnerabilities within the server computing devices 104 and/or 106. Alternatively, for example, the security threat profile data store 120 may include signatures of known malicious code. For example, the security threat profile database 120 may include known signatures of particular spyware, rootkit, key log, viruses, or other malware signatures and the detection module 114 may scan the server computing devices 104 and 106 for the known signatures and malicious signatures. The detection module 114 may also utilize standard anti-malware programs to scan for malware.

In some embodiments, the detection module 114 may include a link-checker module that can scan each link on a web page to ensure that no links are associated with malware. Consistent with some embodiments, the security threat profile data store 120 may include the name of each advertisement partner for a particular cloud provider, as selected advertisements may distribute malware. The detection module 114 may include a natural language processing (NLP) module to identify whether each add as found on a website or cloud web page matches a list of advertisement partners found in the security threat profile database 120. NLP modules may be configured to understand human speech or written language. NLP modules may perform various methods and techniques for analyzing words and phrases (syntactic analysis, semantic analysis, etc.). The NLP module may be configured to recognize and analyze any number of natural languages. In embodiments, NLP modules may parse passages of the applicable ads as found on a website or cloud provider web page. Further, the NLP module may include various sub-modules to aid NLP. These NLP modules may encompass, but are not limited to, a tokenizers, part-of-speech (POS) taggers, semantic relationship identifiers, and syntactic relationship identifiers.

In embodiments, the detection module 114 may also scan for potential code injections (e.g., Structured Query Language (SQL) injections) or cross site scripting (CSS) attacks. A code injection occurs when an unauthorized user issues a database query command to elicit private information as a result of a security vulnerability. A CSS attack can occur when an unauthorized user embeds script tags in Uniform Resource Locators (URLs), and when users select the URL, malware may be distributed to the user's device. In these embodiments, the security threat profile data store 120 may include known signatures or particular strings of signatures known to be injected. For example, SQL injections may be known to inject single quote (') meta-characters or double dash meta-characters (--). Therefore, these known meta-characters may be stored to the security threat profile data store 120 and compared by the detection module 114 to the code of a server computing system associated web page to detect potential code injections.

In some embodiments, once a security threat is detected, the computing device 112 may place a firewall at the site associated with the security threat. For example, as illustrated in FIG. 1, a security threat may be detected within the virtual server 106A. Accordingly, the computing device 112 may place the firewall 110 at the virtual server 106A to isolate the virtual server 106A from the computing network 100, as described in more detail below. In some embodiments, the firewall is placed at the computing device that contains the security threat as opposed to the particular virtual server that contains the security threat. The identity of virtual server 106A may then be added to the infected server data store 118. The infected server data store 118 may store addresses or identities of infected server computing devices or virtual servers such that the computing device 112 may keep track of which server computing systems or virtual servers are infected for cleaning purposes. The computing device 112 may also include a repair module 116 to repair (e.g., clean) an infected virtual server, as described in more detail below.

The computing device 112 may also include a replication module 122. The replication module 122 can replicate an infected virtual server if cleaning the virtual server does not exceed a satisfaction threshold, as described in more detail below. In some embodiments, the computing device 112 may communicate with virtual server template data store 124. Communication between computing device 112 and virtual server template data store 124 can occur during replication. The virtual server template data store 124 may store an image copy of a virtual server as it existed prior to becoming infected with malware or any other security vulnerability. Accordingly, the computing device 112 may replicate an infected virtual server by copying an identical version found in the virtual server template data store 124 to a server computing device, as described in more detail below.

In some embodiments, the detection module 114, the repair module 116, and the replication module 122 may be included in a single software package that is run by a "Central Security Agent" software module. The Central Security Agent may run from a cloud hypervisor or from another system on a different cloud environment (e.g., the external centralized system as described above). In various embodiments, the detection module 114, the repair module 116, and/or the replication module 122 may run on separate computing device in addition to or other than the computing device 112. For example, the computing environment 100 may be a cloud computing environment with distributed computing systems and the detection module 114 may be located within a first computing device, the repair module 116 may be located within a second computing device, and the replication module 122 may be located within a third computing device. In an example illustration, the first computing device may detect a security threat via the detection module 114. The first computing device may then transmit a message to the second computing device instructing the second computing device to repair the security threat via the repair module 116. The second computing device or first computing device may then transmit a message instructing the third computing device to replicate the infected virtual server via the replication module 122.

The computing device 112 may also include a policies and rules data store 126 that specifies policies or rules for aspects of the present disclosure. For example, and as described in more detail below, the policies and rules data store may specify that when the cleaning of a virtual machine does not exceed a particular satisfaction threshold, then a particular replication action should be taken. In some embodiments, the policies and rules data store 126 may include various firewall rules for various embodiments, as described in more detail below.

Figure 2:
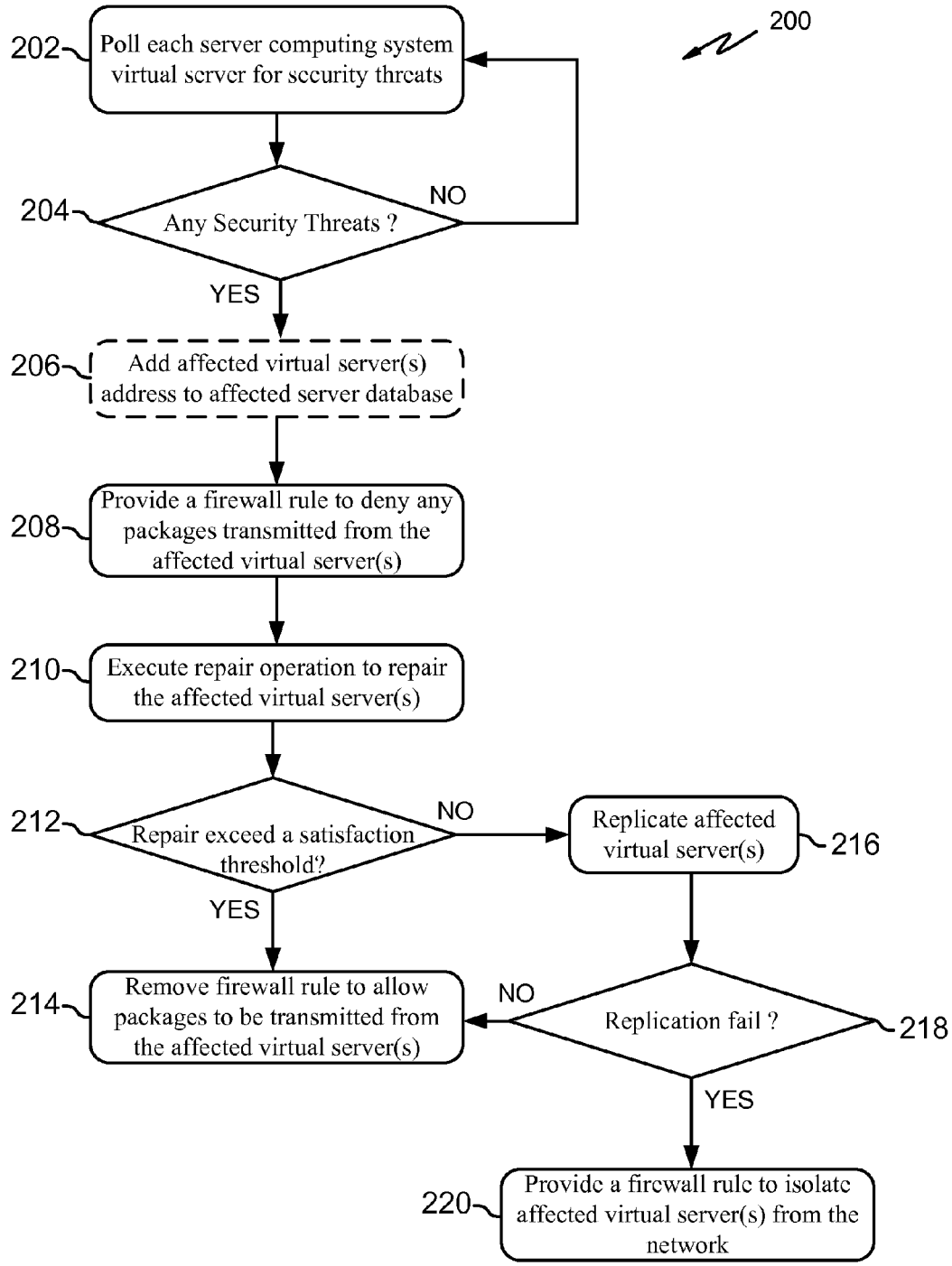
FIG. 2 is a flow diagram of an example process for identifying a security threat, isolating the virtual machine that contains the security threat, and cleaning the virtual machine.

FIG. 2 is a flow diagram of an example process 200 for identifying a security threat, isolating the virtual server that contains the security threat, and cleaning the virtual server. It is to be understood that the order in which the blocks described below are discussed is not to be construed as limiting the order in which the individual acts may be performed. In particular, the acts performed may be performed simultaneously or in a different order than that discussed. In some embodiments, each of the blocks in FIG. 2 may be part of an automated process, which means that no user or administrator interface (e.g., commands, instructions, etc.) is necessary. In other embodiments, users or administrators may perform operations in one or more of the blocks illustrated below.

In some embodiments, the process 200 may begin at block 202 when a first computing system (e.g., computing system 112 of FIG. 1) polls (e.g., via the detection module 114 of FIG. 1) each virtual server within a set of server computing systems for security threats. The first computing system may establish a wireless connection with each associated server computing system (e.g., the server computing system 104 and 106 via VMware protocols) that includes each of the virtual servers. The server computing systems may then transmit an address (e.g., Internet Protocol (IP) address) of each of their associated virtual servers to the first computing system such that the first computing system may poll or check for any security threats. Polling may be performed at any suitable timing schedule (e.g., 1 second, 5 seconds, etc.).

Per block 204, the first computing system may determine whether there are any security threats found on any of the virtual servers. As discussed above, various methods may be utilized to identify the security threat and the security threat may be known security vulnerabilities, known code injection characters, malware, unidentified advertisements, etc. If a security threat is not identified, then the first computing system may continue to perform block 202 to poll each of the virtual servers according to the polling schedule until a security threat is found.

In some embodiments, if the first computing system identifies a security threat, then per block 206, the first computing system may add an address of the affected virtual server(s) to an infected server database (e.g., infected server database 118 of FIG. 1). In these embodiments, the first computing system may transmit, in response to identifying a security threat by the first computing system, an address of the affected virtual servers to a list within the infected data store. The "list" may be a compilation of data that includes a set of virtual server addresses that are associated with or contain respective security threats. Block 206 may be useful in some cases for identifying several security threats on different virtual servers and performing a batched or group clean operation for all of the affected virtual servers at substantially the same time. Batched cleaning may have several advantages. For example, batched cleaning may be useful for performing cleaning operations at less busy time intervals, such that processing and performance may be enhanced. Further, system overhead may be reduced by performing a single clean operation. Instead of running multiple cleaning operations at different times, a single cleaning operation may be performed for multiple instances, thereby reducing overhead.

Per block 208, the first computing system may provision (e.g., provide, configure, instruct another system to implement, supply, etc.), in response to the identifying of the security threat, a first firewall associated with the affected virtual server(s). A "firewall" may be a network security system (hardware or software based) that controls incoming and outgoing network communication or traffic based on a set of rules. The first firewall may include a rule to deny all communication transmitted form the affected virtual server(s). In some embodiments, the first computing system may provision the first firewall by setting iptables. An iptable is a table data structure (e.g., within Linux operating systems) that defines rules and commands as part of the net filter framework that facilitates Network Address Translation (NAT), packet filtering, and packet mangling. In the iptable embodiments, rules may be organized into chains (e.g., rule domains or categories). For example, three default chains may be INPUT, OUTPUT, and FORWARD. INPUT chains manage and contain the rules for all of the packets received by a server (e.g., virtual server). OUTPUT chains manage and contain the rules for all of the packets transmitted or created by a server. FORWARD chains may be utilized to deal with traffic destined for other servers. In an example illustration, a first virtual machine (with address: x.x.x.x), running an Apache server application, may be trying to access data on a second virtual machine (with address: y.y.y.y), running a MySQL database application. If a security threat is discovered on the first virtual machine, the first computing system (e.g., computing system 112 of FIG. 1) may provision the first firewall associated with the first virtual machine (e.g., "ssh monitor@y.y.y.y 'iptables-A OUTPUT-s x.x.x.x-j DROP'"). Accordingly, the first virtual machine may not be able to transmit any packages to the second virtual machine.

Provisioning the first firewall may useful for various purposes. For example, the first firewall may prevent the spreading of malware from one virtual machine or server computing system to another. Further, the first firewall may prevent a virtual server or server computing system from spreading malware to client computing systems.

Per block 210, the first computing system (e.g., computing system 112 of FIG. 1) may execute a repair operation to repair the affected virtual server(s) (e.g., via the repair module 116 of FIG. 1). In some embodiments, the first computing system may execute the repair operation by executing a clean operation to clean the affected virtual servers. To execute a "clean" operation as described herein may mean to attempt to remove malware (e.g., utilize anti-malware modules). Repairing may also include patching and/or removing unauthorized injected code, links, faulty code, or ads. A "patch" may be an update, fix, or improvement of a particular application or module.

Per block 212, the first computing system may determine whether the repair operation exceeded a satisfaction threshold (e.g., via the repair module 116 of FIG. 1 and the policies and rules data store 126). A satisfaction threshold may be based upon a point in time, successful repair operation, and/or a value at which the repairing may be deemed to be satisfactory (e.g., by the Central Externalized System or system administrator). Therefore, if the repairing exceeds the satisfaction threshold, then the repairing may be successful. If the repairing does not exceed the satisfaction threshold, the repairing may be unsuccessful. In an example illustration, if the affected virtual server(s) contained malware, and the first computing system successfully removed all of the malware, then the operation may be successful and therefore exceed a satisfaction threshold. In another example, if an affected virtual server(s) included both a security vulnerability and several forms of malicious code and the first computing system was only able to remove each form of the malicious code but not successfully patch the security vulnerability, the cleaning may or may not be deemed to be above a satisfaction threshold. In these embodiments, each repairing action (e.g., patching, removing malware, removing injections, etc.) may include values that are added when doing a final calculation of whether the repairing is above a satisfaction threshold. In yet another example, a time-based threshold may be associated with the satisfaction threshold. For example, the first computing system may be executing an operation to remove malware, but if it is not successfully able to remove the malware within 5 minutes, then it may have exceeded the time threshold of 5 minutes. Accordingly, if the time threshold has been exceeded, then it may be deemed that the cleaning did not exceed a satisfaction threshold and therefore be unsuccessful. In some embodiments, the satisfaction threshold may be based on the quality of the repair and/or the quantity or portion of code that is repaired. For example, a virtual server may exceed a satisfaction threshold if 70% of the virtual server was repaired (e.g., patched) notwithstanding the 30% that was unable to be repaired.

Per block 214, if the repairing exceeded a satisfaction threshold, then the first computing system may remove (or cause to be removed via the affected server) the first firewall such that communication transmitted from the affected virtual server(s) may be established. Therefore, the affected server may be repaired such that it can resume its duties within the network and transmit packages to other servers and/or the client computing system(s). In some embodiments, a system administrator or an automated process may mark the affected virtual server(s) as sane (i.e., in order to allow the affected virtual server(s) to be utilized within the computing environment 200 and/or migrate to a healthy cloud computing environment, as described in more detail below. Marking the affected virtual server(s) as "sane" may be part of a sanity check process, which includes checking whether a virtual machine configuration is fixed or clean.

Per block 216, if the first computing system determines that the repairing did not exceed the satisfaction threshold, then in response to the determining, the first computing system may initiate replication of the affected virtual server(s). As disclosed herein, "replicate" or "replication" may refer to generating a virtual server that is a copy of at least a portion of another virtual server. In some embodiments, replication may include generating another virtual server that is a clone (e.g., duplicate, copy, etc.) of the affected virtual server or similar to the affected virtual server. In some embodiments, replication may only include a copy of a kernel and any applications needed to run a program (e.g., a container), as opposed to a full system image or VM of a virtual server. Replication may be a virtual server provisioning management process that generates a new virtual server on a particular server computing system and allocates computing resources to support the new virtual server.

Replication may be executed in different manners consistent with various embodiments. For example, in some embodiments, the first computing system may include a data store (e.g., a virtual server template data store 124 of FIG. 1), which includes multiple templates (e.g., VMware template). A template is a complete copy or image of a virtual server that can be cloned or utilized to deploy more similar virtual servers. A template may include a particular virtual server's configuration files and virtual disks. In some embodiments, the first computing system may perform automated virtual server provisioning by first determining that the cleaning did not exceed a satisfaction threshold. In these embodiments, the first computing system may then identify the template within the data store that corresponds with the virtual server that contains the security threat. The first computing system may then copy the template from the data store to the desired server computing system to replicate the infected virtual server. In these embodiments, each template may include the virtual servers before they contained a security threat. For example, in some embodiments, as soon as a virtual machine is generated for the first time within a host, the virtual machine may be copied to a data store as a VMware template to use when and if the virtual machine later contains malware. In some embodiments, a system administrator or user may perform the replication.

In an example illustration, referring back to FIG. 1, if virtual server 106A within server computing system 106 was infected with malware and the computing system 112 did not clean the virtual server 106A above a satisfaction threshold, then the computing system 112 may perform automated virtual server provisioning of the virtual server 106A without system administrator help. The computing system 112 may identify the exact template of virtual server 106A within the virtual server template data store 124, which may be a copy of virtual server 106A before it became infected with malware. The computing system 112 may then copy (e.g., via the replication module 122) the template of virtual server 106A from the virtual server template data store 124 to server computing system 104 such that virtual server 106A is now effectively replicated and copied (without malware) from the server computing system 106 to server computing system 104.

In some embodiments, the first computing system may replicate a virtual server by generating a virtual server instead of copying a virtual server. For example, referring back to FIG. 1, computing system 112 may include a data store (e.g., virtual server template data store 124) of an image of each virtual server. If the virtual server 106A contained a security vulnerability, the computing system 112A may engage in generating (e.g., via the replication module 122) a virtual server with a signature as close as possible to virtual server 106A, without the security vulnerability. Accordingly, the newly generated virtual server may be substantially similar to virtual server 106A.

In some embodiments, replication of particular virtual servers may include migration (e.g., cold migration, live migration, etc.). "Migration" is the process of moving at least a portion of a virtual server (e.g., a VMs configuration files and/or virtual disks) from one host to another host or within a different location within the same host. For example, if a security threat was deemed to be a security vulnerability, and the first computing system was not able to patch the vulnerability, then in some embodiments, the first computing system may migrate the virtual server with the security vulnerability from its host to a second host. In some embodiments, the second host may include a repository of infected virtual servers or virtual servers with known vulnerabilities such that an administrator may try to fix each of the virtual servers within the second host.

In some embodiments, migration may include utilizing replacement artifacts to establish a replica of the infected virtual server(s). "Replacement artifacts" are a series of configuration files, packages and VM images repository and/or services pre-settings that are used to move VMs from an infected system to a brand new (and clean) environment. Some examples of replacement artifacts include configuration files for services such as Apacha/nginx web servers, MySQL/Postgres/MariaDB database servers, sshd, ntpd, postfix, proftpd, etc. Other examples include pre-built VM images, with a specific set of services that are already built (e.g., VMware templates stored in the in the virtual server template date store 124). Other examples include package repositories, which is a way to get automated system updates or install extra packages.

Per block 218, the first computing system may determine whether the replication failed. Whether the replication failed may be based on whether a container or MV was completely able to be replicated or generated. For example, the first computing system may determine (e.g., via the replication module 122 and policies and rules data store 126) whether it was able to generate a virtual machine analogous to the virtual machine that contains a security vulnerability. A determination of whether a replication failed may be further based on specified rules or policies regarding replication (e.g., as found in the policies and rules data store 126 of FIG. 1). For example, a replication may be deemed to have failed if a virtual server was not able to be generated and replicated without the security vulnerability.

If the replication did not fail, then per block 214, the first computing system may cause the first firewall to be removed such that packages communicated from the affected virtual server(s) can be transmitted. If the replication failed, then per block 220, the first computing system may provision a second firewall to isolate the affected virtual server(s) from the entire network such that no communication may occur (i.e., all communication is prohibited) to or from the affected virtual server(s). In some embodiments, the same first firewall may still be implemented (i.e., block 208) to deny any packages transmitted from the affected virtual machine(s) such that a system administrator may try to remotely or manually fix the security threat.

Figure 3:
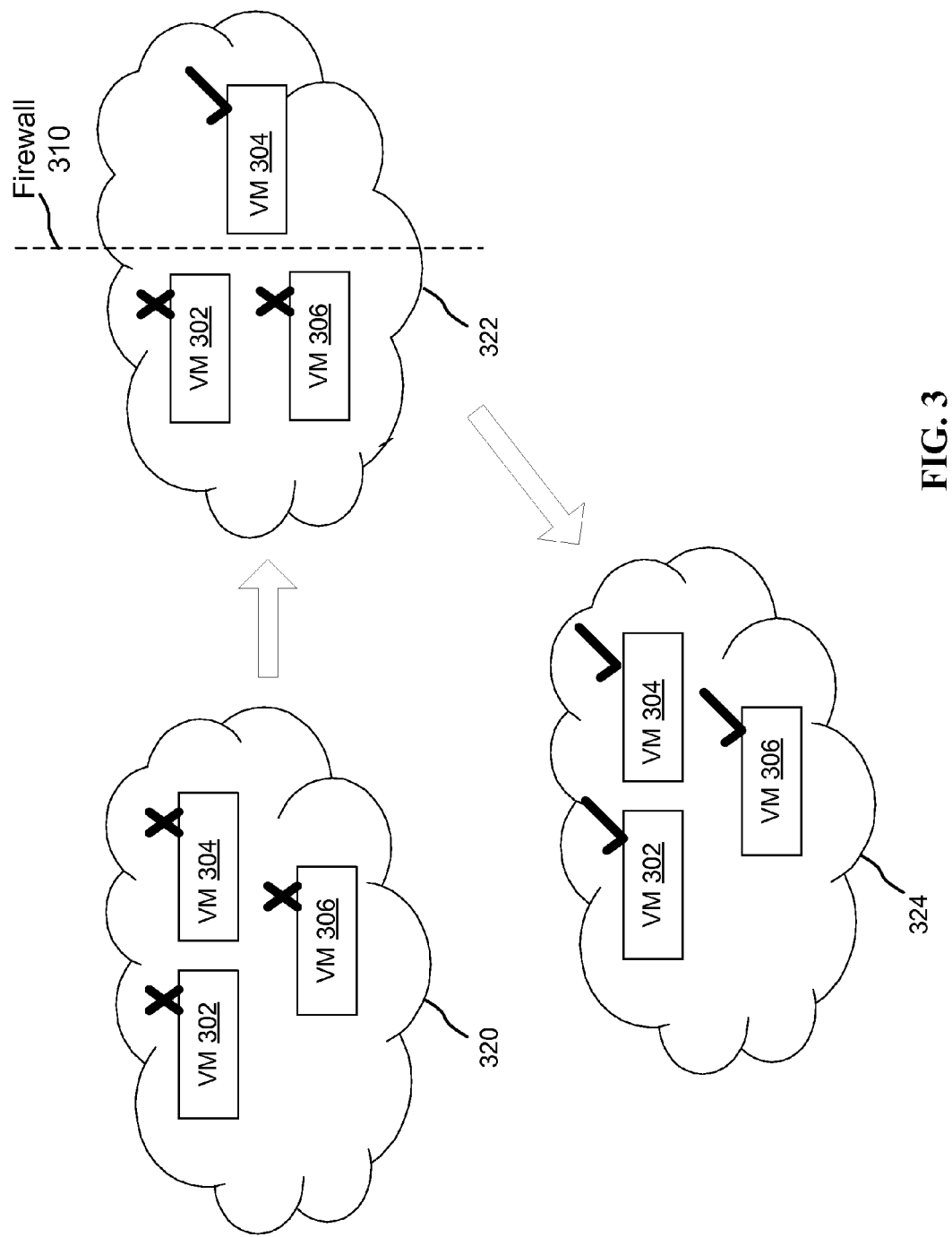
FIG. 3 is a block diagram depicting various virtual machines being migrated from an unhealthy cloud computing environment, in response to detecting malware, to a healthy environment after the virtual machines are clean, according to embodiments.

FIG. 3 is a block diagram depicting various virtual machines being migrated from an unhealthy cloud computing environment, in response to detecting malicious code, to a healthy cloud computing environment after the virtual machines are clean, according to embodiments. In some embodiments, FIG. 3 may represent containers being migrated. In some embodiments, in response to a security threat being detected, one or more virtual servers may be migrated from one cloud computing environment to another cloud computing environment (or sub-cloud computing environment). As illustrated in FIG. 3, the first cloud computing environment 320 may include VMs 302, 304, and 306. The "X" indicates that each of the VMs have been infected with malicious code (or other security threat). In response to the security threat being detected on each of the VMs 302, 304, and 306, the VMS may be migrated from the first cloud computing environment 320 to a second sub-cloud computing environment 322. A "sub-cloud" environment as described herein may be a subset of dedicated resources (e.g., servers, storage, applications, and/or services) within a larger existing cloud networking environment. For example, the first cloud computing environment 320 may be the larger existing cloud networking environment, and the second sub-cloud computing environment 322 may include a subset of dedicated resources within the first cloud computing environment 320.

When the infected VMs 203, 304, and 306 are within the sub-cloud computing environment 322, a firewall 310 may be placed at each of the infected VMs in order to clean (or repair) the VMs. As illustrated in FIG. 3, the firewall 310 may first be placed at VM 304 such that VM 304 may be repaired. The checkmark above VM 304 within FIG. 3 indicates that the VM 304 has been repaired above a satisfaction threshold. As described above, the firewall 310 may include a rule to deny communication coming from the VM 304. The firewall 310 may be placed at the other VMs 302 and 306 as well in order to execute additional clean operations. In some embodiments, as soon as each of the VMs 304, 302, and 306 are repaired they may be migrated a second time from the sub-cloud computing environment 322 to a third cloud computing environment 324. In some embodiments, the third cloud computing environment 324 is the same cloud computing environment as the first cloud computing environment 320. In other embodiments, the third cloud computing environment 324 is a different cloud computing environment.

Figure 4:
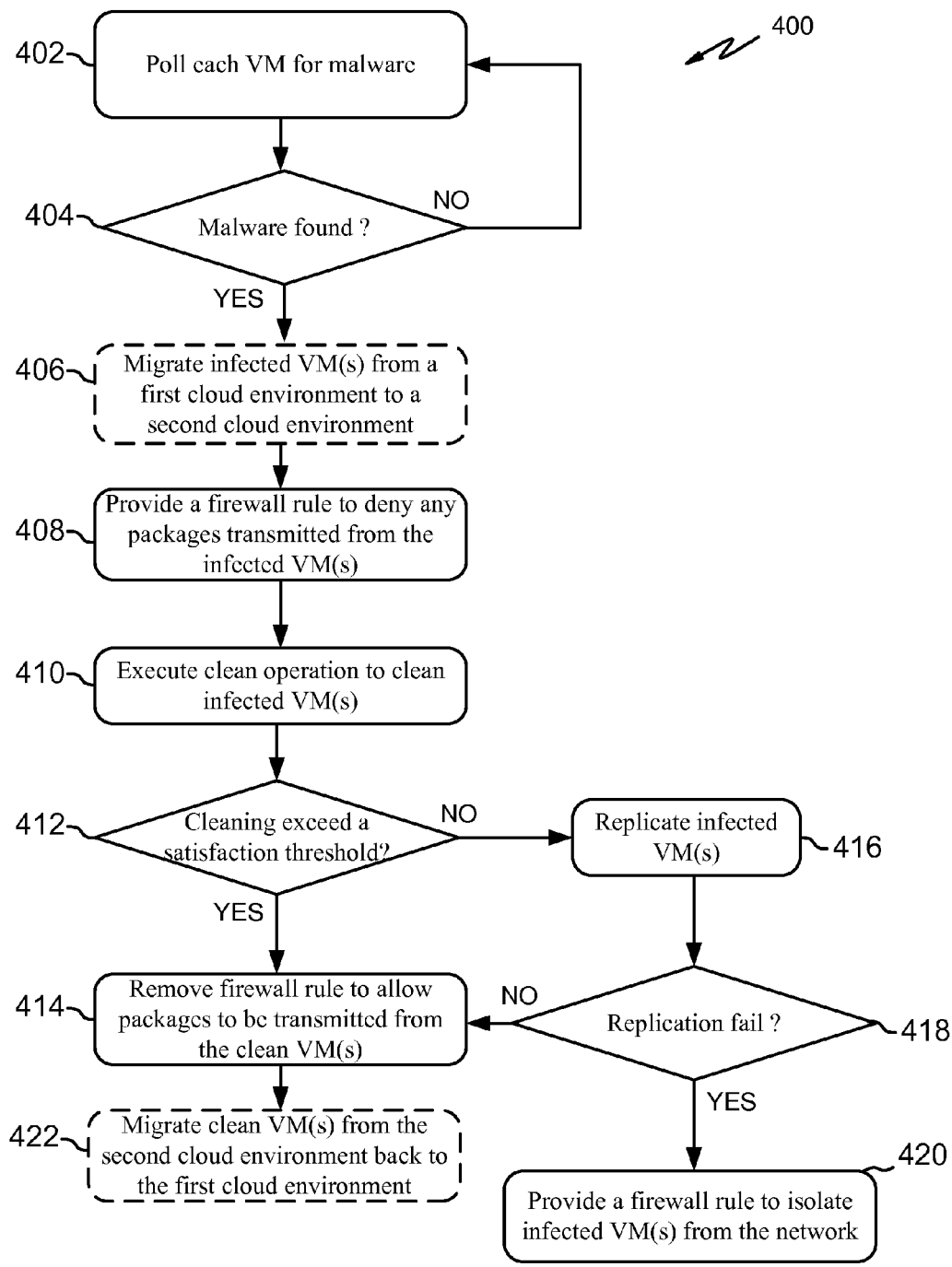
FIG. 4 is a flow diagram of an example process 400 for detecting malware for a given set of virtual machines (VMs), migrating such VMs, executing a clean operation, and replicating the VMs if needed, according to embodiments.

FIG. 4 is a flow diagram of an example process 400 for detecting malicious code for a given set of VM, migrating such VMs, executing a clean operation, and replicating the VMs if needed, according to embodiments. In some embodiments, the process 400 may begin at block 402 when a first computing system (e.g., computing system 112 of FIG. 1 or external centralized system) polls each VM for malicious code. Per block 302, if malware is not found then block 402 may occur continually until malicious code is found.

In some embodiments, if malicious code is found on any of the VMs, then per block 406, the infected VMs may be migrated from a first cloud computing environment to a second cloud computing environment, as described above. In other embodiments, migration does not have to occur or other operations may occur in addition to migration. For example, block 408 may occur or other operations may occur such as adding the infected VM address to an affected server database (e.g., block 206 of FIG. 2).

Per block 408, the first computing system may provision a firewall to deny any packages transmitted from the infected VM(s), as described above. Per block 410, the first computing system itself may execute a clean operation to clean the infected VM(s). In some embodiments, the first computing system may transmit a message to a separate cleaning computing system to execute the clean operation.

Per block 412, the first computing system (or other cleaning system) may determine whether the cleaning exceeded a satisfaction threshold. If the cleaning did not exceed a satisfaction threshold, then per block 416, the first computing system may replicate the infected VM(s) as described above.

Per block 414, if the cleaning did exceed a satisfaction threshold, then the first computing system may remove the firewall to allow packages to be transmitted from the now clean VM(s). Per block 422, in response to the removing of the firewall, the first computing system may migrate the clean VM(s) from the second cloud computing environment back to the first cloud computing environment. In some embodiments, the clean VM(s) may be migrated to another clean cloud computing environment that is not the first cloud computing environment. As described above, in some embodiments, migration does not have to occur.

Per block 418, it may be determined whether the replication failed. If replication did not fail, then per block 414, the first computing system may remove the firewall to allow packages to be transmitted from the clean VM(s). If the replication failed, then per block 420 the first computing system may provision a firewall to isolate the infected VM(s) from the network.

In some embodiments, FIG. 2, FIG. 3 and/or FIG. 4 may be illustrated by the following pseudocode sequence:

```
# This process will be run continuously
for each system s in the cloud do
    detect_malware(s)              #run by an external centralized
                                    system
    if malware found then
        add system s to infected_group
done
# Centralized system send message to clean system to run the follow
for each clean system c do
    get list of infected_group
    for each system in infected_group do
        place a firewall rule to deny packages coming from this system
    done
done
for each system s in infected_group do
    try_clean(s)                   #run by an external centralized
                                    system
    if clean failed then
        try to replicate system and move workload to this replica
        if replication failed then
            place a firewall rule to isolate this system from any
            network address
done
```

Figure 5:
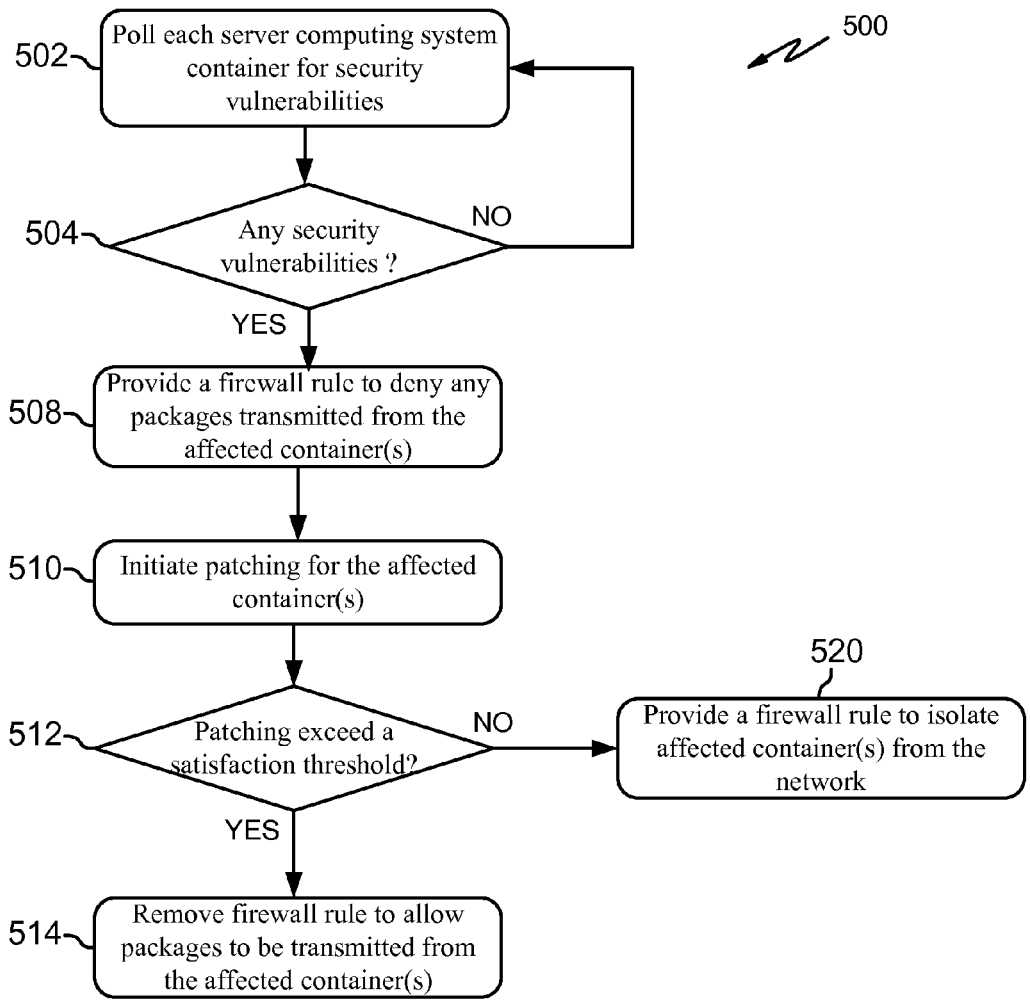
FIG. 5 is a flow diagram of an example process for identifying a security vulnerability within a container, firewalling the container, and initiating patching for the affected container.

FIG. 5 is a flow diagram of an example process for identifying a security vulnerability within a container, fire-walling the container, and initiating patching for the affected container. In some embodiments, the process 500 may begin at block 502 when a first computing system (e.g., computing system 112 of FIG. 1) polls each server computing system container for security vulnerabilities. In some embodiments, FIG. 5 may correspond to VMs (as opposed to containers) and/or malicious code (as opposed to security vulnerabilities).

Per block 504, if no security vulnerabilities are discovered within any of the containers, then block 502 may be performed continually until a security vulnerability is found. If one or more security vulnerabilities are found within any of the containers, then per block 508, the first computing system may provision a firewall to deny any packages transmitted from the affected container(s). In some embodiments, in response to the discovering of any security vulnerabilities, other operations may occur, such as migrating the containers from a first cloud computing environment to a second cloud computing environment (e.g., an operation analogous to block 406 of FIG. 4). In some embodiments, in response to the discovering of any security vulnerabilities, the computing system may add affected container(s) address to an affected server database (e.g., block 206 of FIG. 2).

Per block 510, the first computing system may engage in a repair operations, such as initiating patching for the affected container(s). Per block 512, the first computing system may determine whether the patching exceeded a satisfaction threshold. If the patching did not exceed a satisfaction threshold, then per block 520, the first computing system may, per block 520, provision a firewall to isolate the affected container(s) from the network. Per block 514, if the patching exceeded a satisfaction threshold, the first computing system may remove the firewall to allow packages to be transmitted from the affected container(s).

Figure 6:
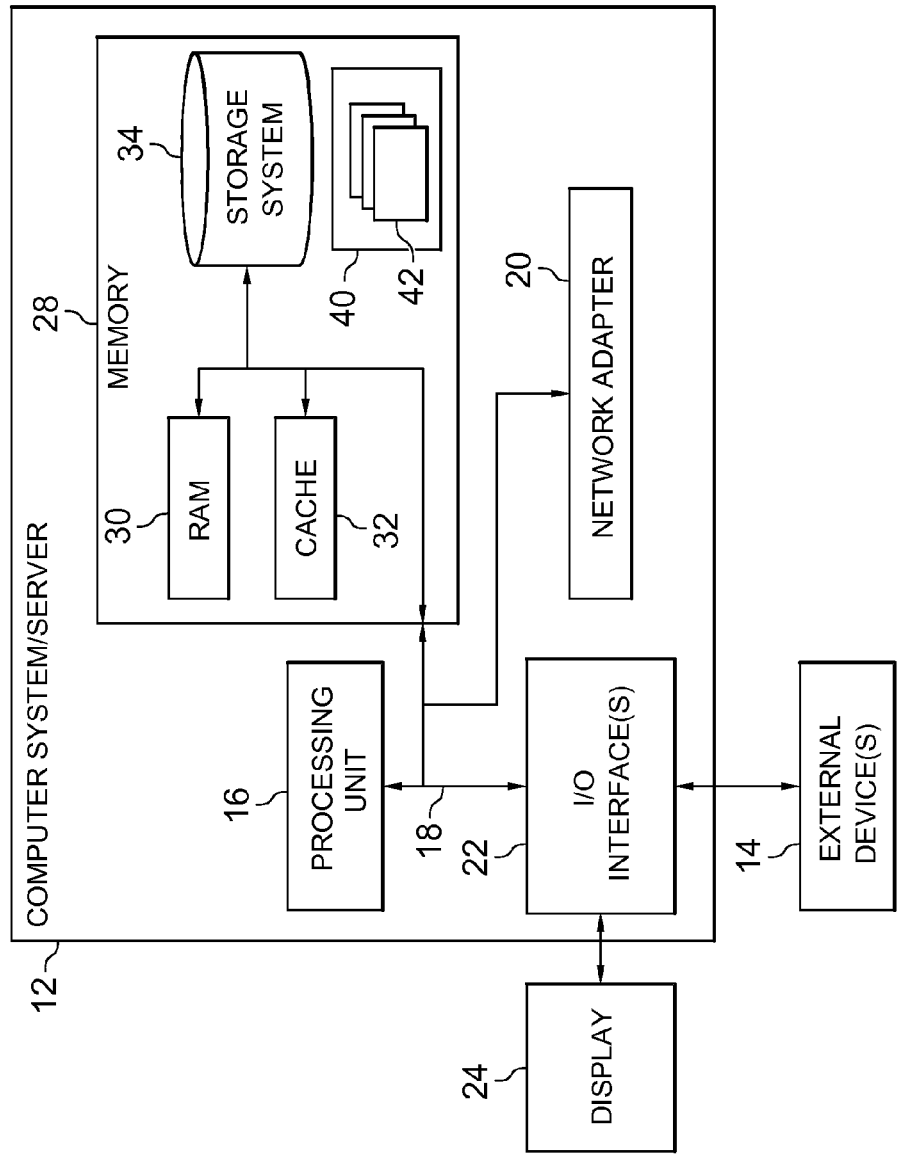
FIG. 6 depicts a computer system/server, according to embodiments.

Referring now to FIG. 6, a schematic of an example of a computer system/server 12 is shown. In some embodiments, the computer system/server 12 may be one or more of the Cloud computing nodes 10 of FIG. 7, as described in more detail below.

The computer system/server 12 may be operational with numerous general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing systems. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
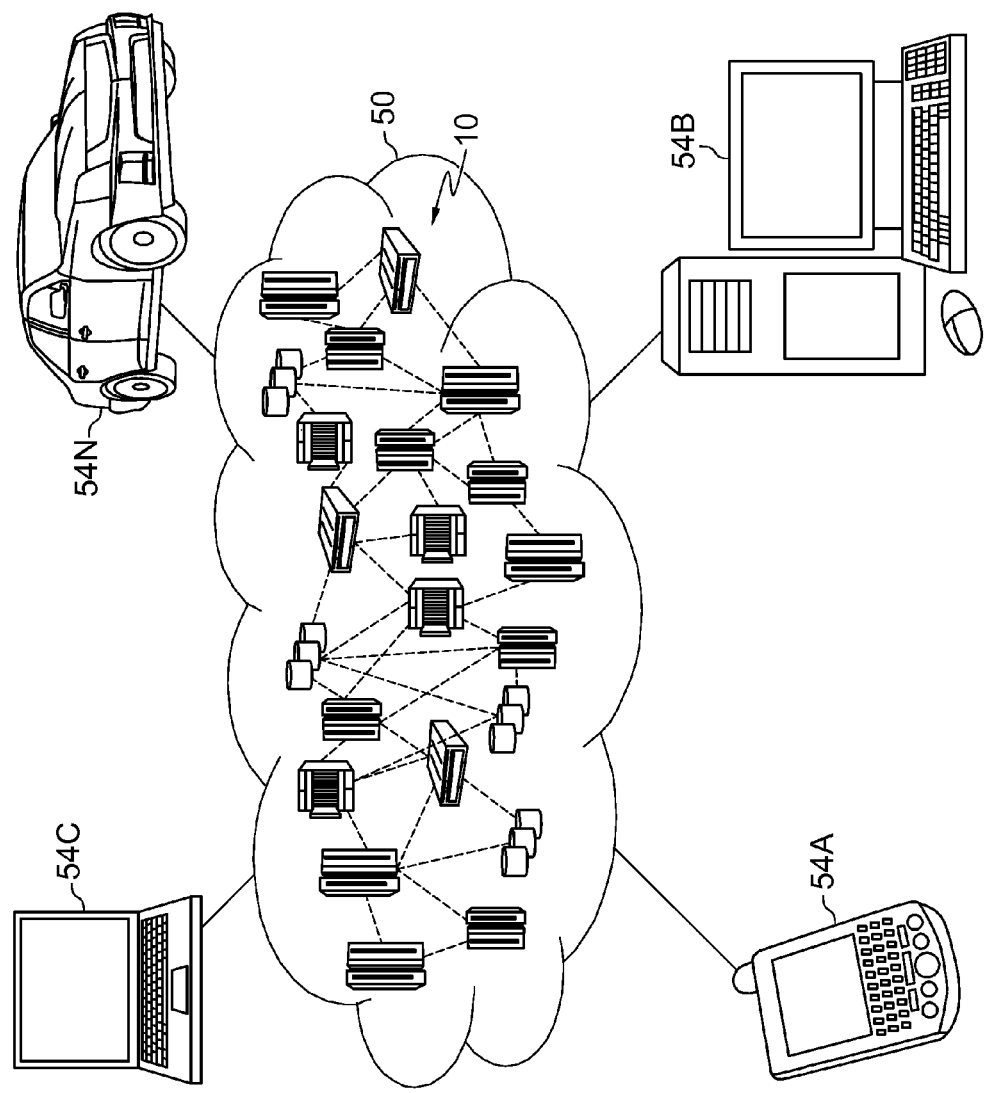
FIG. 7 depicts a cloud computing environment, according to embodiments.

Referring now to FIG. 7, illustrative cloud computing environment 50 is depicted. As shown, cloud computing environment 50 comprises one or more cloud computing nodes 10 with which local computing systems used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing system. It is understood that the types of computing systems 54A-N shown in FIG. 1 are intended to be illustrative only and that computing nodes 10 and cloud computing environment 50 can communicate with any type of computerized device over any type of network and/or network addressable connection (e.g., using a web browser).

Figure 8:
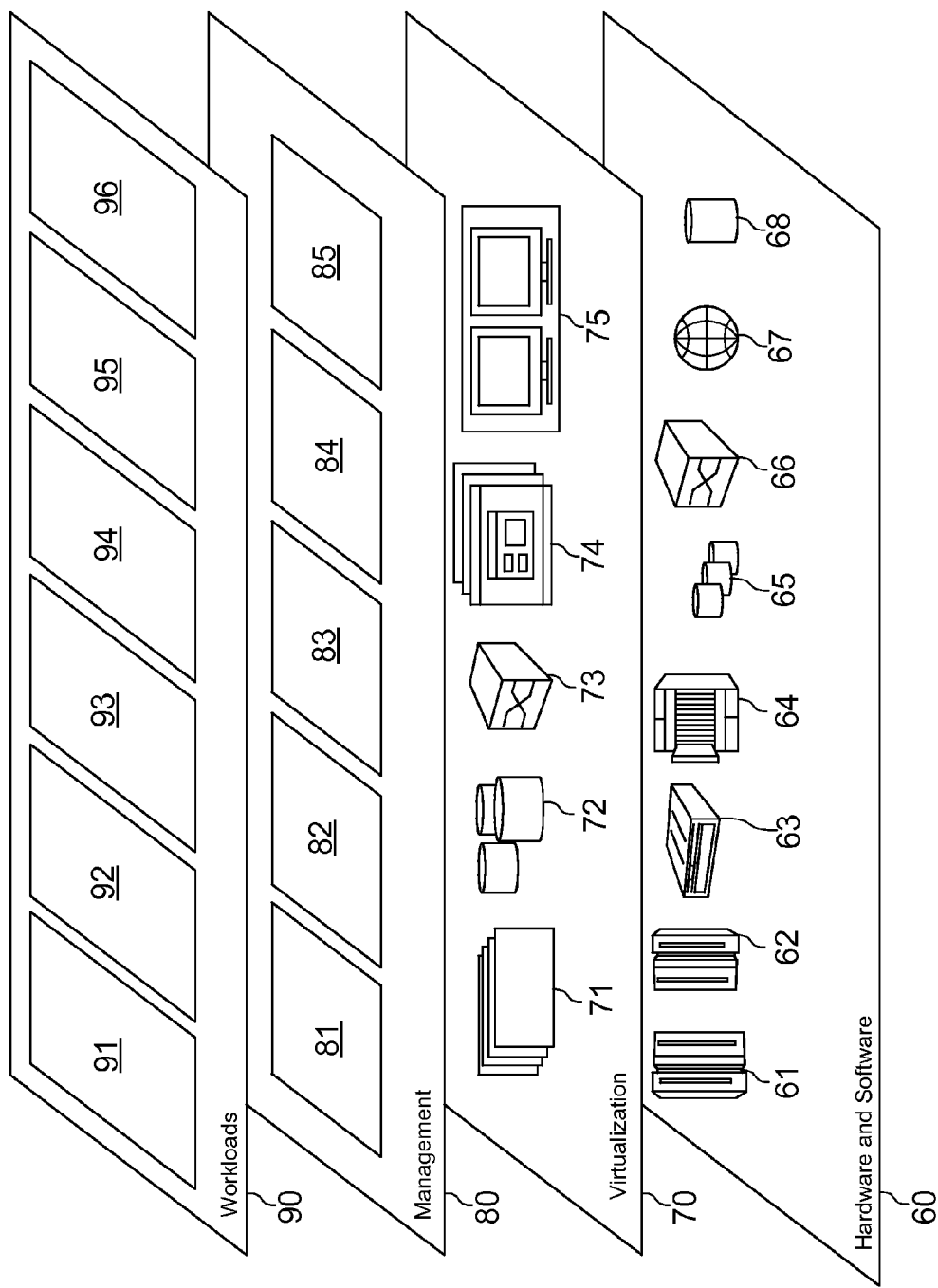
FIG. 8 depicts abstraction model layers, according to embodiments.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and repairing a computing system in a network that is associated with a security threat 96.

Aspects of the present invention may be a system, a method, and/or a computer program product. The computer program product may include a computer readable storage medium (or media) having computer readable program instructions thereon for causing a processor to carry out aspects of the various embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for repairing a computing system in a network that is associated with a security threat, the system comprising:
    a first computing system having a processor; and
    a computer readable storage medium having program instructions embodied therewith, the program instructions executable by the processor to cause the system to:
        identify a security threat located at least at a first virtual server, the first virtual server within a second computing system;
        provision, in response to the identifying, a first firewall associated with the first virtual server, the first firewall including a rule to deny all communication transmitted from the first virtual server;
        execute, in response to the provisioning, a first repair operation to repair the first virtual server;
        determine that the first repair operation did not exceed a satisfaction threshold;
        initiate, in response to the determining, replication of the first virtual server, wherein the replication generates a second virtual server that is a copy of at least a portion of the first virtual server;
        determine that the replication failed; and
        provision, in response to the determining that the replication failed, a second firewall, the second firewall including a rule to isolate the first virtual server from the network, wherein the rule prohibits communication to and from the first virtual server.

2. The system of claim 1, wherein the network is a first cloud computing environment, and wherein the program instructions executable by the processor further cause the system to:
    migrate, in response to the identifying the security threat, the first virtual server from the first cloud computing environment to a second cloud computing environment, and wherein the provisioning of the first firewall and the executing of the first repair operation occurs in the second cloud computing environment;
    determining that the first repair operation exceeds a second satisfaction threshold; and
    in response to the determining, migrating the first virtual server from the second cloud computing environment to the first cloud computing environment.

3. The system of claim 1, wherein the security threat is a security vulnerability, the security vulnerability including a program defect in the first virtual server.

4. The system of claim 1, wherein the first virtual server is a virtual machine, wherein a virtual machine is a full copy or image of an operating system and all of a hardware that the operating system needs to run.

5. A computer program product for repairing a computing system in a network that is associated with a security threat, the computer program product comprising a computer readable storage medium having program code embodied therewith, the program code comprising computer readable program code configured for:
    identifying, by a first computing system, a security threat located at least at a first virtual server, the first virtual server within a second computing system;
    provisioning, in response to the identifying and by the first computing system, a first firewall associated with the first virtual server, the first firewall including a rule to deny communication transmitted from the first virtual server;
    transmitting, in response to the provisioning and by the first computing system, a first message to a third computing system, the first message instructing the third computing system to execute a first repair operation to repair the first virtual server;
    determining that the replication failed;
    in response to the determining that the replication failed, provisioning a second firewall, the second firewall including a rule to isolate the first virtual server from the network, wherein the rule prohibits communication to and from the first virtual server;
    determining that the first repair operation did not exceed a satisfaction threshold; and
    in response to the determining that the first repair operation did not exceed the satisfaction threshold, transmitting a second message to the third computing system, the second message instructing the third computing system to replicate the first virtual server, wherein the replicate generates a second virtual server that is a copy of at least a portion of the first virtual server.

6. The computer program product of claim 5, wherein the computer readable program code is further configured for:
    transmitting, prior to the provisioning and by the first computing system, an address of the first virtual server to a list within a data store, wherein the list includes addresses for a set of virtual servers that are associated with respective security threats;
    provisioning, based on the list and by the first computing system, a set of firewalls associated with the set of virtual servers, wherein each of the set of firewalls include a rule to deny all communication transmitted from the set of virtual servers; and transmitting, by the first computing system, a third message to the third computing system, the third message instructing the third computing system to execute a second set of repair operations to repair the set of virtual servers.

7. The computer program product of claim 5, wherein the instructing the third computing system includes instructing the third computing system to migrate configuration files and virtual disks of the first virtual server to the second virtual server.

8. The computer program product of claim 5, wherein the computer readable program code is further configured for:

determining, by the first computing system, that the first repair operation exceeds the satisfaction threshold; and in response to the determining, removing the first firewall from the first virtual server, wherein the removing causes the communication to be transmitted from the first virtual server.

\* \* \* \* \*